UNITED STATES PATENT OFFICE.

BENJAMIN WOOLSTON COLLINS, OF SWARTHMORE, PENNSYLVANIA, ASSIGNOR TO E. I. DU PONT DE NEMOURS AND COMPANY, OF WILMINGTON, DELAWARE, A CORPORATION OF DELAWARE.

PROCESS OF FILTERING.

1,413,457.     Specification of Letters Patent.     Patented Apr. 18, 1922.

No Drawing.     Application filed November 12, 1917. Serial No. 201,713.

*To all whom it may concern:*

Be it known that I, BENJAMIN WOOLSTON COLLINS, of Swarthmore, in the county of Delaware, and in the State of Pennsylvania, have invented a certain new and useful Improvement in Processes of Filtering, and do hereby declare that the following is a full, clear, and exact description thereof.

My invention relates particularly to a process of filtering by means of which filtration may be carried out quickly and without difficulty, and it has application to the filtering of many different liquids.

The object of my invention is to provide a process and a filtering medium used therewith, by means of which liquids carrying insoluble particles, and which may be of very small size, may be filtered rapidly.

In general my invention involves the use of a filtering medium comprising a fairly heavy gelatinous substance which will tend to coagulate the fine particles present in the liquid, either when added to the liquid, or when the liquid is passed through a filter bed comprised of such filtering material. I have found that precipitated gelatinous silicic acid is particularly useful as such filtering medium. The filtering medium is particularly useful with organic solvents especially those oily organic solvents which are not miscible with water. In the case where the silicic acid is used as a filter bed, the filter may or may not be protected by an outer coating of some other material. The filter bed may be covered by a filter cloth or a wire screen to prevent disturbance in the filter bed by currents in the solution being filtered.

While my invention is capable of being carried out in many different ways, for the purpose of illustration I have described only one form thereof hereinafter.

For example, I may proceed as follows:

A quantity of silicic acid should be prepared. This may be done by acidifying a solution of sodium silicate with hydrochloric acid and warming the same. Then, while agitating the solution, it is rendered alkaline by the addition of an alkaline reagent such, for example, as caustic soda. The silicic acid precipitate is allowed to settle, and the dissolved substances are removed by decantation. The precipitate is then washed with alcohol or acetone to remove water, and the silicic acid as obtained will be found to be in a flocculent, gelatinous, finely divided state, free from lumps. The silicic acid thus obtained may be added to a solution comprising the following constituents in the proportions stated: benzol 70 parts, trinitrotoluol 30 parts. Thereafter, upon filtering, the solution will be found to pass readily and rapidly through the filter, thus removing the fine particles suspended in the liquid to be filtered. Instead of adding the silicic acid to the solution to be filtered, the silicic acid may be used as a filter bed by placing it in a filter and then passing the liquid to be filtered through the same. The silicic acid will effectively filter the solution while permitting it to pass readily and rapidly through the filter.

While I have described my invention above in detail, I wish it to be understood that many changes may be made therein without departing from the spirit thereof.

I claim:

1. The process which comprises filtering solid particles from an organic solvent immiscible with water by passing the same through silicic acid.

2. The process which comprises filtering solid particles from an organic solvent immiscible with water by passing the same through a gelatinous silicic acid.

3. The process which comprises filtering solid particles from an organic solvent immiscible with water by passing the same through a gelatinous precipitated silicic acid.

4. The process which comprises filtering solid particles from an organic solvent immiscible with water by passing the same through a finely divided gelatinous silicic acid.

5. The process which comprises filtering solid particles from an organic solvent immiscible with water by passing the same through a finely divided gelatinous precipitated silicic acid.

6. The process which comprises filtering solid particles from a solution containing an oily organic solvent by passing the same through a gelatinous material.

7. The process which comprises filtering solid particles from a solution containing an oily organic solvent by passing the same through a gelatinous silicic acid.

8. The process which comprises filtering solid particles from a solution containing an oily organic solvent by passing the same through a gelatinous precipitated silicic acid.

9. The process which comprises filtering solid particles from a solution containing an oily organic solvent by passing the same through a finely divided gelatinous silicic acid.

10. The process which comprises filtering solid particles from a solution containing an oily organic solvent by passing the same through a finely divided gelatinous precipitated silicic acid.

11. The process which comprises filtering solid particles from a solution of trinitrotoluol in benzol by passing the same through a gelatinous material.

12. The process which comprises filtering solid particles from a solution of trinitrotoluol in benzol by passing the same through a gelatinous silicic acid.

13. The process which comprises filtering solid particles from a solution of trinitrotoluol in benzol by passing the same through a finely divided gelatinous precipitated silicic acid.

In testimony that I claim the foregoing I have hereunto set my hand.

BENJAMIN WOOLSTON COLLINS.

Witnesses:
L. N. CLAUSEN,
JERUSHA JOHNSON.